United States Patent [19]
Lee et al.

[11] Patent Number: 5,590,198
[45] Date of Patent: Dec. 31, 1996

[54] OPEN METERING SYSTEM WITH SUPER PASSWORD VAULT ACCESS

[75] Inventors: David K. Lee, Monroe; David W. Riley, Easton, both of Conn.

[73] Assignee: Pitney Bowes Inc., Stamford, Conn.

[21] Appl. No.: 574,749

[22] Filed: Dec. 19, 1995

[51] Int. Cl.$^6$ ................................................. H04L 9/00
[52] U.S. Cl. ............................... 380/21; 380/23; 380/25; 380/48
[58] Field of Search ................................ 380/21, 23–25, 380/51, 48

[56] References Cited

U.S. PATENT DOCUMENTS

| | | | |
|---|---|---|---|
| 4,218,738 | 8/1980 | Matyas et al. | 380/25 |
| 4,578,530 | 3/1986 | Zeidler | 380/24 |
| 4,725,718 | 2/1988 | Sansone et al. | 235/495 |
| 4,731,575 | 3/1988 | Sloan | 324/113 |
| 4,757,537 | 7/1988 | Edelmann et al. | 380/51 |
| 4,775,246 | 10/1988 | Edelmann, et al. | 380/23 |
| 4,807,139 | 2/1989 | Liechti | 364/464.02 |
| 4,831,555 | 5/1989 | Sansone et al. | 395/113 |
| 4,873,645 | 10/1989 | Hunter et al. | 364/479 |
| 5,107,455 | 4/1992 | Haines et al. | 395/828 |
| 5,185,795 | 2/1993 | Bright | 380/21 |
| 5,224,046 | 6/1993 | Kim et al. | 364/464.02 |
| 5,323,465 | 6/1994 | Avarne | 380/23 |
| 5,377,268 | 12/1994 | Hunter | 380/23 |

*Primary Examiner*—Thomas H. Tarcza
*Assistant Examiner*—Pinchus M. Laufer
*Attorney, Agent, or Firm*—Charles R. Malandra, Jr.; Melvin J. Scolnick

[57] ABSTRACT

A super password is a one time use password that is issued to a user for the singular purpose of reinitializing the user password system for a meter. When the meter is manufactured, the meter and the Data Center share secret data such that they can execute a predefined and identical algorithm for secure communication. Through such secure communications, the Data Center can authenticate a metering system, and the metering system can accept a predefined command from the Data Center securely. Counters are used as data to encrypt. One counter is used for the one way communication from the meter to the data center and counts the number of times that the meter issues a one time authentication code. Another counter is used for the one way communication from the Data Center to the meter and counts the number of times that the Data Center issues a one time super password. The counters are used for two purposes: as data to be encrypted and to confirm the delivery of secure codes between the Data Center and the meter. The use of counters in the process eliminates problems that undelivered messages would create.

10 Claims, 8 Drawing Sheets

OPEN METERING SYSTEM WITH SUPER PASSWORD VAULT ACCESS

FIELD OF THE INVENTION

The present invention relates generally to value printing systems and, more particularly, to value printing systems wherein a printer is not dedicated to a metering module.

RELATED APPLICATIONS

The present application is related to the following U.S. patent applications Ser. Nos. 575,106; 575,107; 574,746; 574,745; 575,110; 574,743; 575,112; 575,109; 575,104; 575,111, each filed concurrently herewith, and assigned to the assignee of the present invention.

BACKGROUND OF THE INVENTION

Postage metering systems are being developed which employ digital printers to print encrypted information on a mailpiece. Such metering systems are presently categorized by the USPS as either closed systems or open systems. In a closed system, the system functionality is solely dedicated to metering activity. A closed system metering device includes a dedicated printer securely coupled to a metering or accounting function. In a closed system, since the printer is securely coupled and dedicated to the meter, printing cannot take place without accounting. In an open metering system, the system functionality is not dedicated solely to metering activity. An open system metering device includes a printer that is not dedicated to the metering activity, thus freeing system functionality for multiple and diverse uses in addition to the metering activity. An open system metering device is a postage evidencing device (PED) with a non-dedicated printer that is not securely coupled to a secure accounting module.

Typically, the postage value for a mailpiece is encrypted together with other data to generate a digital token which is then used to generate a postage indicia that is printed on the mailpiece. A digital token is encrypted information that authenticates the information imprinted on a mailpiece including postal value. Examples of systems for generating and using digital tokens are described in U.S. Pat. No. 4,757,537, 4,831,555, 4,775,246, 4,873,645 and 4,725,718, the entire disclosures of which are hereby incorporated by reference. These systems employ an encryption algorithm to encrypt selected information to generate at least one digital token for each mailpiece. The encryption of the information provides security to prevent altering of the printed information in a manner such that any misuse of the tokens is detectable by appropriate verification procedures.

Typical information which may be encrypted as part of a digital token includes origination postal code, vendor identification, data identifying the PED, piece count, postage amount, date, and, for an open system, destination postal code. These items of information, collectively referred to as Postal Data, when encrypted with a secret key and printed on a mall piece provide a very high level of security which enables the detection of any attempted modification of a postal revenue block or a destination postal code. A postal revenue block is an image printed on a mall piece that includes the digital token used to provide evidence of postage payment. The Postal Data may be printed both in encrypted and unencrypted form in the postal revenue block. Postal Data serves as an input to a Digital Token Transformation which is a cryptographic transformation computation that utilizes a secret key to produce digital tokens. Results of the Digital Token Transformation, i.e., digital tokens, are available only after completion of the Accounting Process.

Digital tokens are utilized in both open and closed metering systems. However, for open metering systems, the non-dedicated printer may be used to print other information in addition to the postal revenue block and may be used in activity other than postage evidencing. In an open system PED, addressee information is included in the Postal Data which is used in the generation of the digital tokens. Such use of the addressee information creates a secure link between the mailpiece and the postal revenue block and allows unambiguous authentication of the mail piece.

Since open and closed metering systems function as encryption devices, the metering portion of the system must be secure logically as well as physically. Typically, user access of an encryption device is controlled by a lock, such as, a lock to the room housing the device, a lock on the device itself, or a logical lock such as the password that limits access to the device. If a password that controls access to an open or closed metering system is forgotten, the device becomes useless until the password can be replaced. Generally, the higher the level of security, the more difficult the procedure to replace an existing password. For example, metering systems require such a high level of security that a user may be required to send at least the metering device, i.e., the vault, to the manufacturing vendor to reinitialize the password protection system of the metering device. When the metering device is returned to the user, the user enters a new password which activates the password protection system for further use of the metering system.

Users have been known to provide their own 'safety net' to prevent forgotten security passwords. Generally, a user may hide the security password with the hope that it can be retrieved if ever the password is forgotten. Knowing that this practice compromises the security of the password protection system, users resort to such practice because the alternative, i.e., having to return the metering portion to the manufacturer, is a burden that prevents use of the metering system for a period of time.

SUMMARY OF THE INVENTION

The present invention provides an alternate process for reinitializing a user password system so that the metering unit does not have to be returned to the manufacturer when a user password is forgotten. In accordance with the present invention a super password, defined herein as a one time use password, is issued to a user for the singular purpose of reinitializing the user password system for the user's metering system. When the metering system is manufactured, the metering unit, i.e. the vault, and the Data Center share secret data. The vault and the Data Center, both execute a predefined and identical algorithm for secure communication. Through such secure communications, the Data Center can authenticate a metering system, and the metering system can accept a predefined command from the Data Center securely.

When a user forgets the user password, the vault issues an encrypted code that the includes the information of how many times the super password has been used. The user reports the code and serial number to the data center. Using the code, the data center generates the super password. When this is entered to the vault, it confirms the validity by performing its own encryption process. Since the date is used as part of encryption, the super password is valid only for the day of the report.

The present invention uses counters as data to encrypt. One pair of counters, one in the meter and the corresponding one in the Data Center, is used for the one way communication from the meter to the data center. This pair counts the number of times that the meter issues a one time authentication code. Similarly another pair is used for the one way communication from the Data Center to the meter. This pair counts the number of times that the Data Center issues a one time super password. The counters are used for two purposes: as data to be encrypted and to confirm the delivery of secure codes between the Data Center and the meter. Such confirmation is necessary because the meter cannot confirm delivery of the authentication code to the Data Center. Likewise, the Data Center cannot confirm the delivery of super password to the meter. An example is that, even though the Data Center issued a super password, the meter might not receive it or a user might not have entered it to the meter. The use of counters in the process eliminates problems that undelivered messages would create.

DESCRIPTION OF THE DRAWINGS

The above and other objects and advantages of the present invention will be apparent upon consideration of the following detailed description, taken in conjunction with accompanying drawings, in which like reference characters refer to like parts throughout, and in which.

DETAILED DESCRIPTION OF THE PRESENT INVENTION

Figure 1:
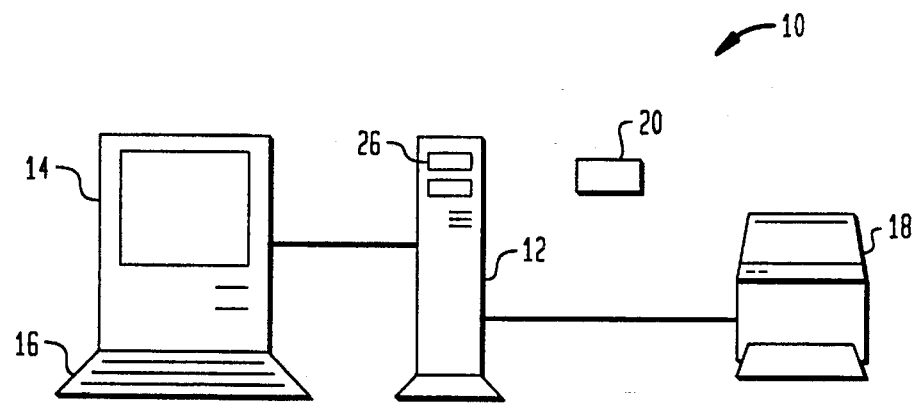
FIG. 1 is a block diagram of a PC-based metering system in which the present invention is used.

In describing the present invention, reference is made to the drawings, wherein there is seen in FIGS. 1–4 an open system PC-based postage meter, also referred to herein as a PC meter system, generally referred to as 10, in which the present invention provides super password vault access when a user password is forgotten. PC meter system 10 includes a conventional personal computer configured to operate as a host to a removable metering device or electronic vault, generally referred to as 20, in which postage funds are stored. PC meter system 10 uses the personal computer and its printer to print postage on envelopes at the same time it prints a recipient's address or to print labels for pre-addressed return envelopes or large mailpieces. As used herein, the term personal computer is used generically and refers to present and future microprocessing systems with at least one processor operatively coupled to user interface means, such as a display and keyboard, and storage media. The personal computer may be a workstation that is accessible by more than one user.

It will be understood that although the preferred embodiment of the present invention is described with regard to a postage metering system, the present invention is applicable to any value metering system that includes a transaction evidencing.

The PC-based postage meter 10 includes a personal computer (PC) 12, a display 14, a keyboard 16, and an non-secured digital printer 18, preferably a laser or ink-jet printer. PC 12 includes a conventional processor 22, such as the 80486 and Pentium processors manufactured by Intel, and conventional hard drive 24, floppy drive(s) 26, and memory 28. Electronic vault 20, which is housed in a removable card, such as PCMCIA card 30, is a secure encryption device for postage funds management, digital token generation and traditional accounting functions. PC meter system 10 may also include an optional modem 29 which is located preferably in PC 12. Modem 29 is for communicating with a Data Canter for recharging funds (debit or credit) and for requesting a super password in accordance with the present invention. In an alternate embodiment the modem may be located in PCMCIA card 30.

PC meter system 10 further includes a Windows-based PC software module 34 (FIGS. 3 and 4) that is accessible from conventional Windows-based word processing, database and spreadsheet application programs 36. PC software module 34 includes a vault dynamic link library (DLL) 40, a user interface module 42, and a plurality of sub-modules that control the metering functions. DLL module 40 securely communicates with vault 20 and provides an open interface to Microsoft Windows-based application programs 36 through user interface module 42. DLL module 40 also securely stores an indicia image and a copy of the usage of postal funds of the vault. User interface module 42 provides application programs 36 access to an electronic indicia image from DLL module 40 for printing the postal revenue block on a document, such as an envelope or label. User interface module 42 also provides application programs the capability to initiate remote refills and to perform administrative functions.

Thus, PC-based meter system 10 operates as a conventional personal computer with attached printer that becomes a postage meter upon user request. Printer 18 prints all documents normally printed by a personal computer, including printing letters and addressing envelopes, and in accordance with the present invention, prints postage indicia.

Figure 2:
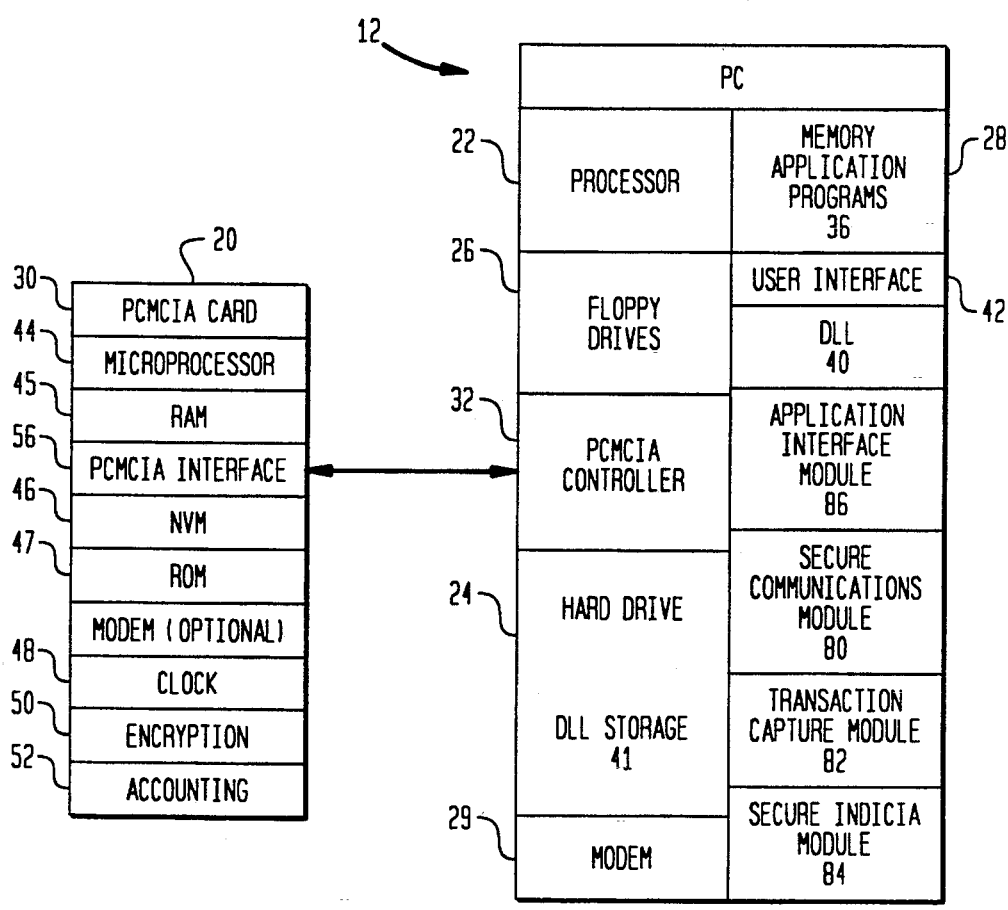
FIG. 2 is a schematic block diagram of the PC-based metering system of FIG. 1 including a removable vault card and a DLL in the PC.
Figure 3:
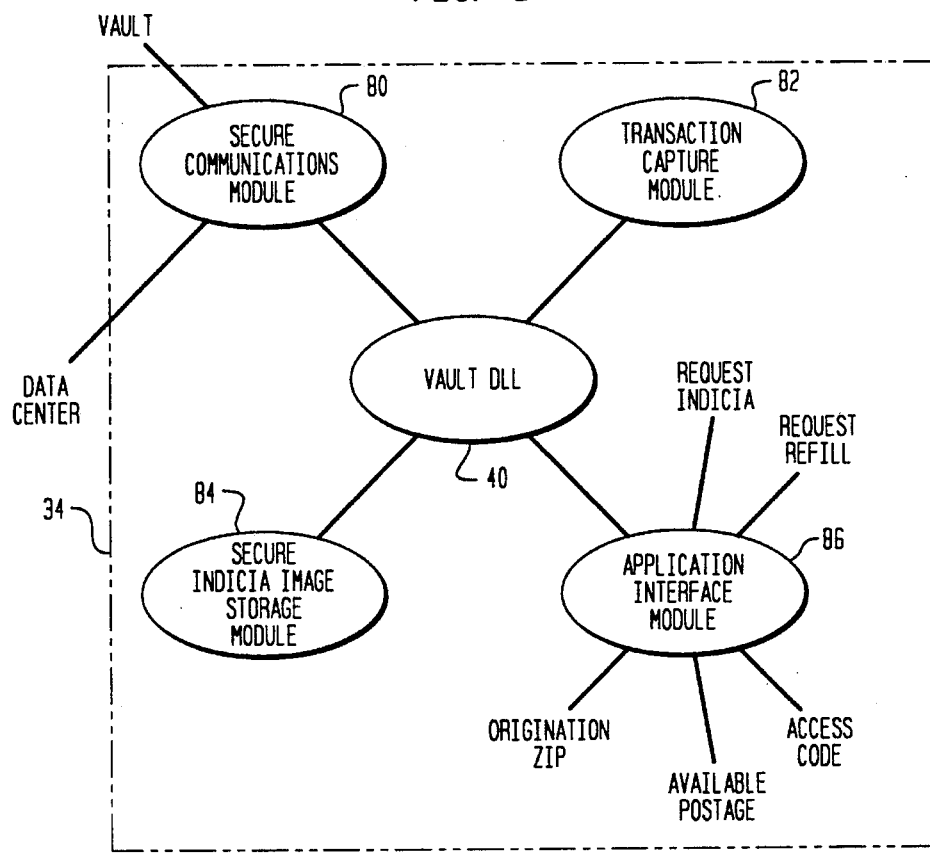
FIG. 3 is a block diagram of the DLL sub-modules in the PC-based metering system of FIG. 1.
Figure 4:
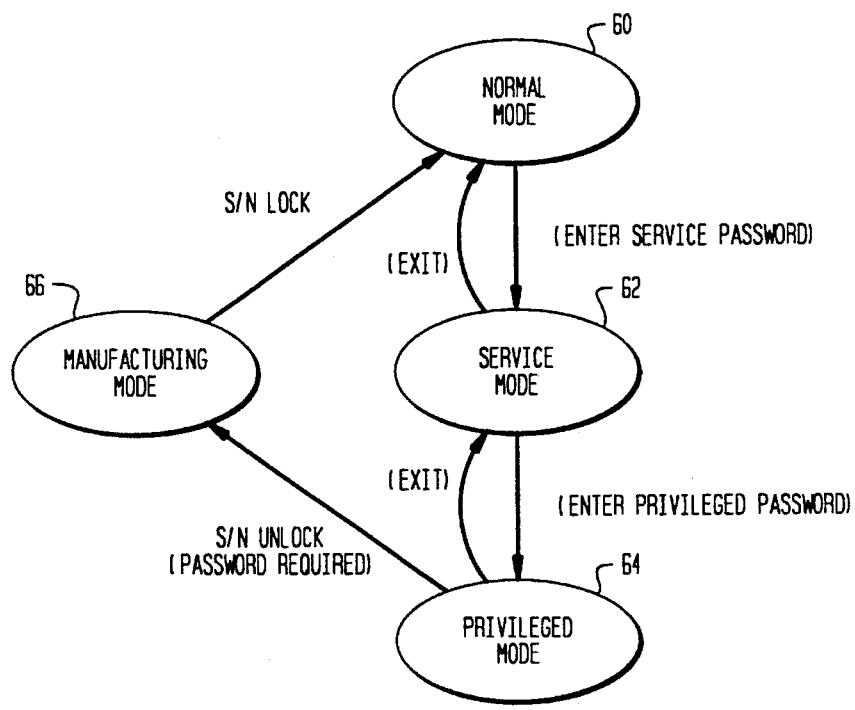
FIG. 4 is a flow diagram of vault mode transitions in the PC-based metering system of FIG. 1.

The vault is housed in a PCMCIA I/O device, or card, 30 which is accessed through a PCMCIA controller 32 in PC 12. A PCMCIA card is a credit card size peripheral or adapter that conforms to the standard specification of the Personal Computer Memory Card International Association. Referring now to FIGS. 2 and 3, the PCMCIA card 30 includes a microprocessor 44, redundant non-volatile memory (NVM) 46, clock 48, an encryption module 50 and an accounting module 52. The encryption module 50 may implement the NBS Data Encryption Standard (DES) or another suitable encryption scheme. In the preferred embodiment, encryption module 50 is a software module. It will be understood that encryption module 50 could also be a separator device, such as a separate chip connected to microprocessor 44. Accounting module 52 may be EEPROM that incorporates ascending and descending registers as well as postal data, such as origination ZIP Code, vendor identification, data identifying the PC-based postage meter 10, sequential piece count of the postal revenue block generated by the PC-based postage meter 10, postage amount and the date of submission to the Postal Service. As is known, an ascending register in a metering unit records the amount of postage that has been dispensed, i.e., issued by the vault, in all transactions and the descending register records the value, i.e., amount of postage, remaining in the metering unit, which value decreases as postage is issued.

The hardware design of the vault includes an interface 56 that communicates with the host processor 22 through PCMCIA controller 32. Preferably, for added physical security, the components of vault 20 that perform the encryption and store the encryption keys (microprocessor 44, ROM 47 and NVM 46) are packaged in the same integrated circuit device/chip that is manufactured to be tamper proof. Such packaging ensures that the contents of NVM 46 may be read only by the encryption processor and are not accessible outside of the integrated circuit device. Alternatively, the entire card 30 could be manufactured to be tamper proof.

DLL 40 includes the following software sub-modules. Secure communications sub-module 80 controls communications between PC 12 and vault 20. Transaction captures sub-module 82 stores transaction records in PC 12. Secure indicia image creation and storage sub-module 84 generates an indicia bitmap image and stores the image for subsequent printing. Application interface sub-module 86 interfaces with non-metering application programs and issues requests for digital tokens in response to requests for indicia by the non-metering application programs. A more detailed description of PC meter system 10 is provided in related U.S. patent application Ser. No. 575,112 filed concurrently herewith.

Generally, a conventional postage meter is equipped with a physical key to protect it from unauthorized access. However, for vault 20, a physical key is not practical because the vault is a small electronic device void of mechanical parts. Thus, a user password system in the vault protects it from illegal attempts to access the vault. A user can opt to use vault 20 without any protection, or can activate the vault user password system.

The password system of the vault is designed to protect the user postal funds. When vault 20 is manufactured, it may be operated without a user password. A user activates the password system by entering a user password. (Alternately, vault 20 may be manufactured such that the user password must be activated upon initial use.) Once the user password system is activated, the user must log into vault 20 by entering the user password so that PC meter system 10 can issue digital tokens for an indicia. The user can either log out from the vault or rely on a time-out feature that automatically logs out from the vault if vault 20 is idle for a predetermined amount of time. Each subsequent use requires reentry of the user password. The user can also change the user password or deactivate the user password system.

In accordance with the present invention, a super password system provides a process for replacing a forgotten user password. At manufacturing, vault 20 and the Data Center shared secret data. Using such secret data, vault 20 and the Data Center can execute a predefined and identical algorithm for secure communication therebetween. In this manner, the Data Center can authenticate vault 20, and also vault 20 can accept a predefined command from the Data Center securely. The following description of the super password system refers to FIGS. 5–9 which provide the detailed steps for such a system. In following description, the encryption key is not updated so that description is straightforward. It will be understood that changing the encryption key makes the system more secure.

The present invention uses counters as data to encrypt. One pair of counters, one in the meter and the corresponding one in the Data Center, is used for the one way communication from the meter to the data center. This pair counts the number of times that the meter issues a one time authentication code. Similarly another pair is used for the one way communication from the Data Center to the meter. This pair counts the number of times that the Data Center issues a one time super password. The counters are used for two purposes: as data to be encrypted and to confirm the delivery of secure codes between the Data Center and the meter. Such confirmation is necessary because the meter cannot confirm delivery of the authentication code to the Data Center. Likewise, the Data Center cannot confirm the delivery of super password to the meter. An example is that, even though the Data Center issued a super password, the meter might not receive it or a user might not have entered it to the meter. The use of counters in the process eliminates problems that undelivered messages would create.

Figure 5:
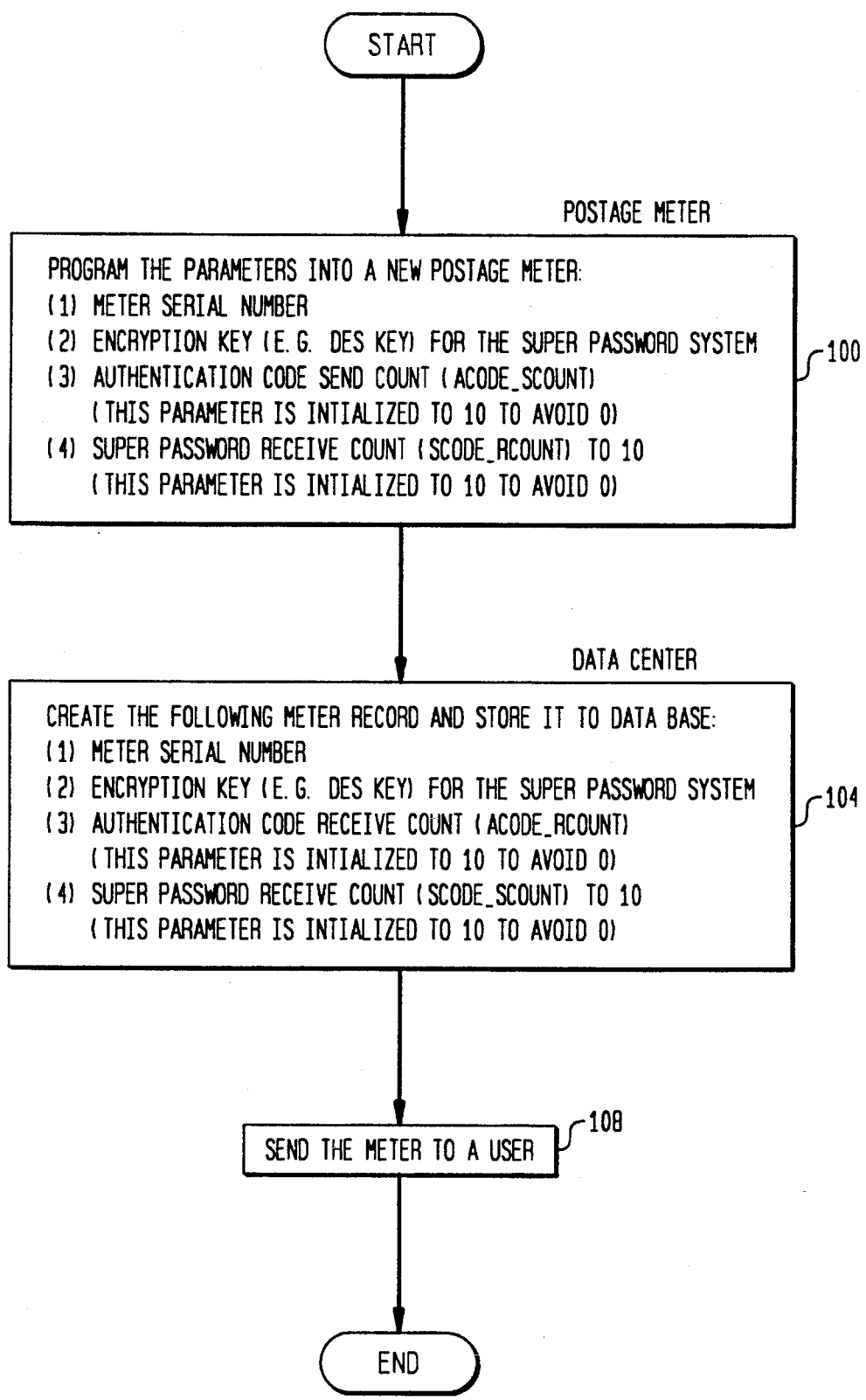
FIG. 5 is a flow chart showing the preparation at manufacturing time for a super password system of the present invention.

Referring now to FIG. 5, when a new postage meter is manufactured the super password system of the present invention is initialized. At step 100, a new vault 20 is programmed with the following parameters: meter serial number; an encryption key, such as a DES key, for the super password system; an Authentication Code Send Count (ACODE_SCOUNT); and a Super Password Receive Count (SCODE_RCOUNT). The information is sent to The Data Center where, at step 104, the Data Center creates a meter record including the foregoing parameters: meter serial number; the encryption key, such as a DES key, for the super password system; the Authentication Code Receive Count (ACODE_RCOUNT); and the Super Password Send Count (SCODE_SCOUNT). The meter record is stored in a meter database. When the new vault 20 is sent to a user, at step 108, the super password system is initialized in the new vault 20 and at the Data Center. When the user first uses PC-based metering system 10, the user enters a user password which prevents further use of the meter unless the user password is entered.

Figure 6:
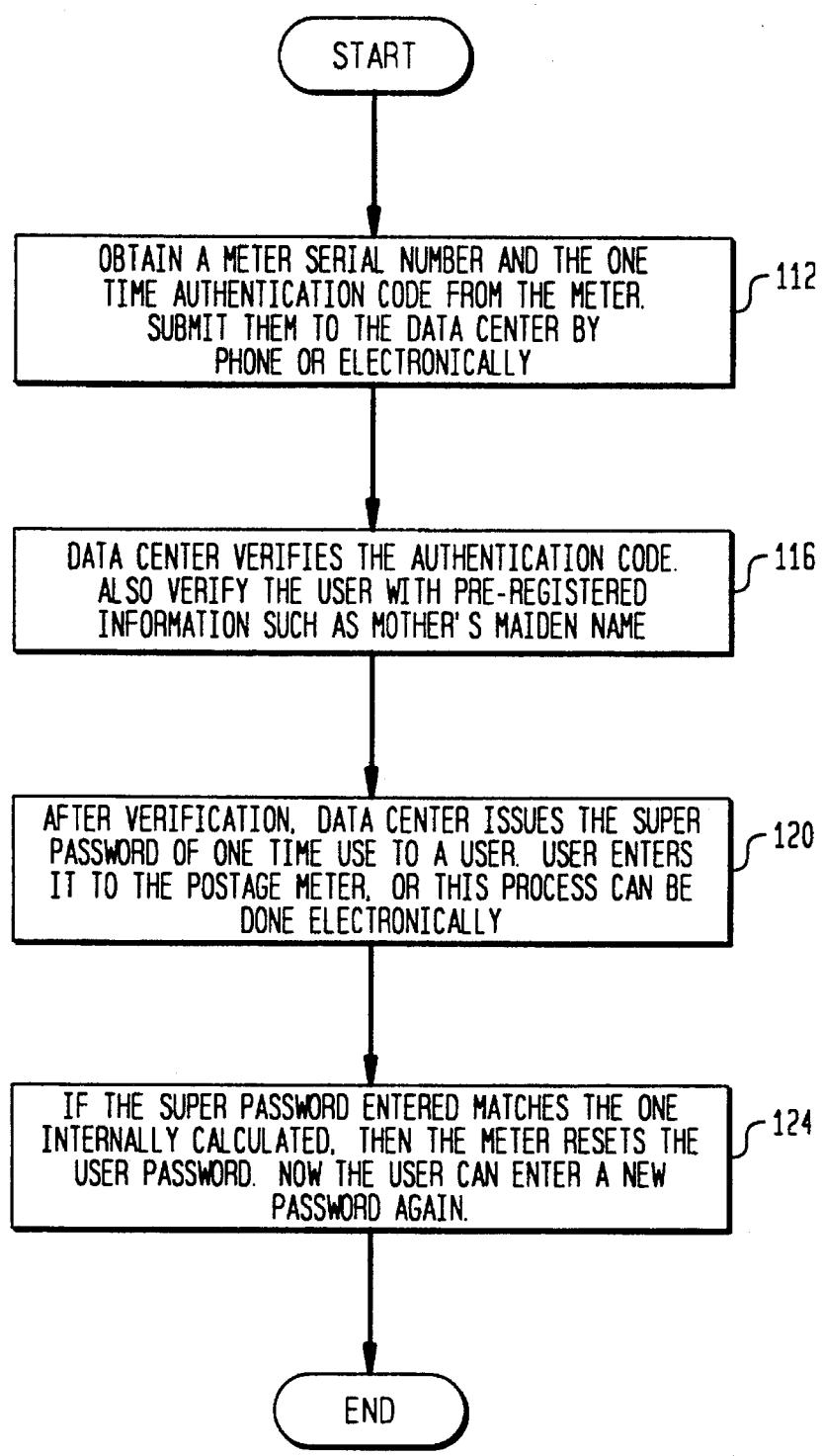
FIG. 6 is a flow chart showing the procedure to obtain a super password for one time use only when a user forgets the user password.

Referring now to FIG. 6, when a user forgets the user password the user, at step 112, submits the meter serial number and the one time authentication code to the Data Center by phone or electronically. At step 116, the Data Center verifies the authentication code and verifies the user with pre-registered information, such as mother's maiden name. After verification, the Data Center issues to the user, at step 120, a super password that can be used only one time. The super password may be entered into PC-based metering system 10 electronically, or the user may enter the super password manually. At step 124, If the super password entered matches the one internally calculated, then the meter resets the user password system so that the user can enter a new user password. At this point PC-based metering system 10 is operational again with the new user password.

Figure 7:
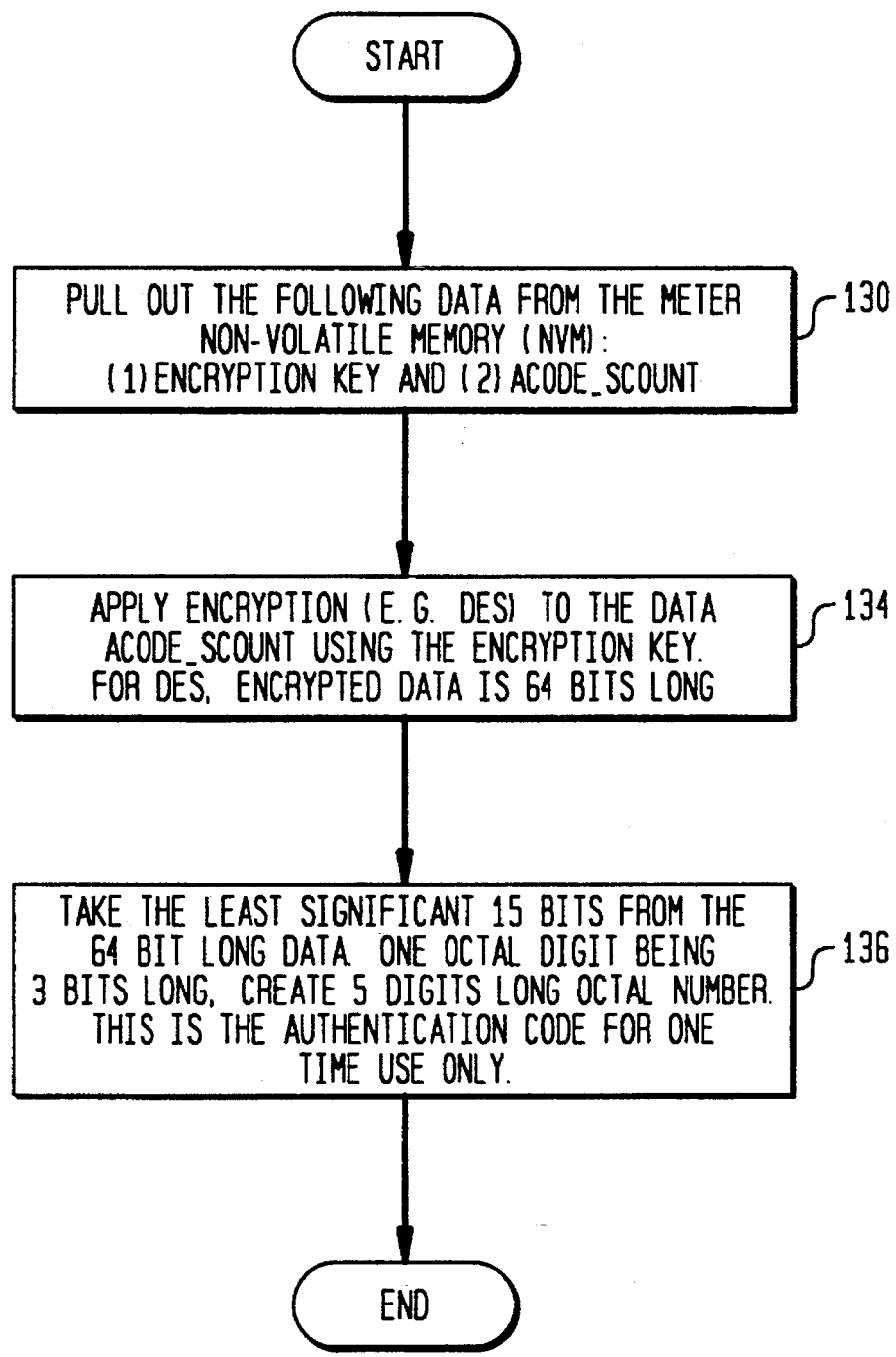
FIG. 7 is a flow chart of the authentication code generation process from the meter.

Referring now to FIG. 7, an authentication code generation process which takes place in vault 20 is shown. At step 130, the encryption key and the Authentication Code Send Count (ACODE_SCOUNT), which were programmed into vault 20 during manufacture, are read from NVM 46. At step 134, the encryption key is applied to the Authentication Code Send Count (ACODE_SCOUNT) to obtain encrypted data. For DES, the encrypted data is 64 bits long. A five digit octal number is obtained from the encrypted data, at step 136. The least significant 15 bits of the encrypted data are divided into five digits, each 3 bits long. This five digit number is the authentication code for one time use only.

Figure 8:
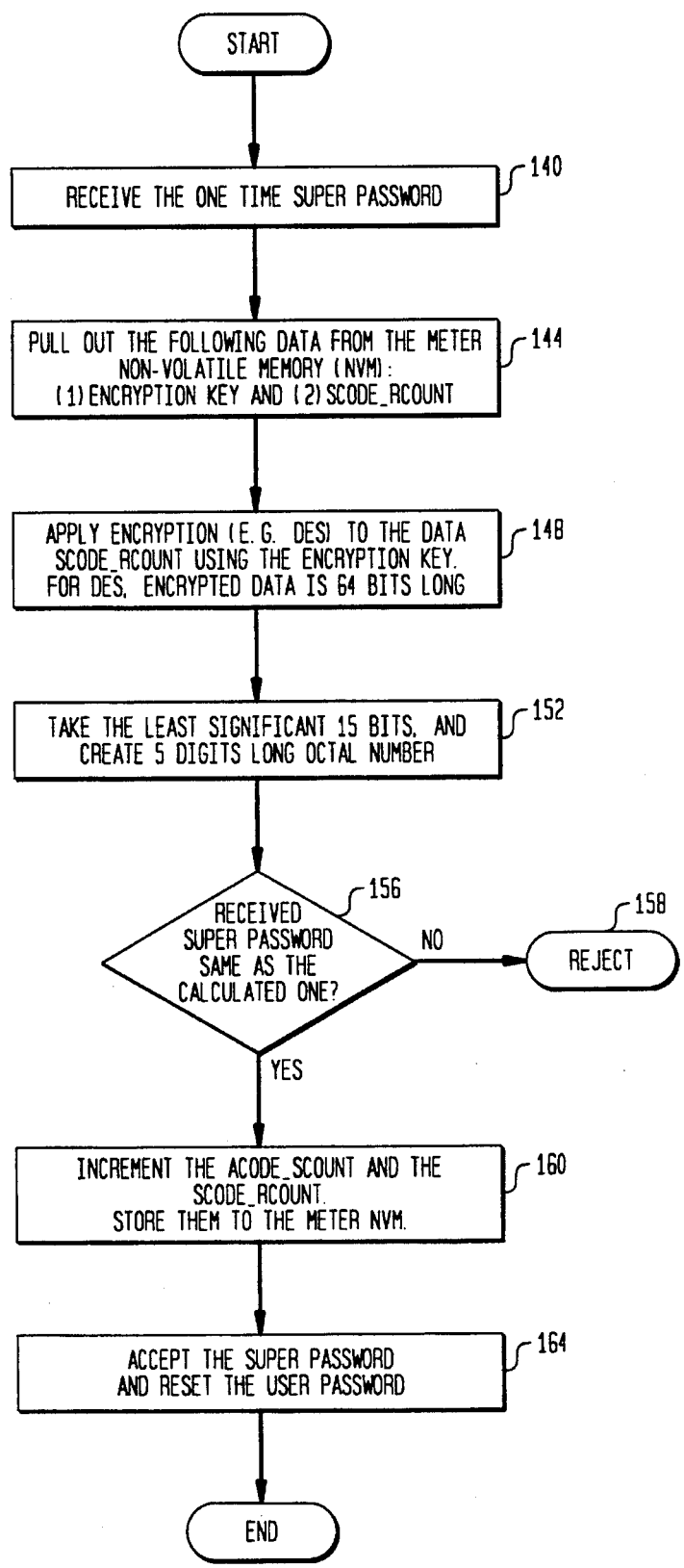
FIG. 8 is a flow chart of the procedure for the meter to accept the super password from the Data Center.

Referring now to FIG. 8, a procedure is shown for meter acceptance of the super password received from the Data Center. At step 140, vault 20 receives the one time super password through secure communications module 80. At step 144, the encryption key and the Super Password Receive Count (SCODE_RCOUNT), which were programmed into vault 20 during manufacture, are read from NVM 46). At step 148, the encryption key is applied to the Super Password Receive Count (SCODE_RCOUNT) to obtain encrypted data. A five digit octal number is obtained from the encrypted data, at step 152. The least significant 15 bits of the encrypted data are divided into five digits, each 3 bits long. At step 156, the received super password is compared to the calculated. If not the same then the password is rejected at step 158. If the same, then, at step 160, vault 20 increments the Authentication Code Send Count (ACODE_SCOUNT) and the Super Password Receive Count (SCODE_RCOUNT) and stores them to the NVM 46. At step 164, vault 20 accepts the received super password and resets the user password.

Figure 9A:
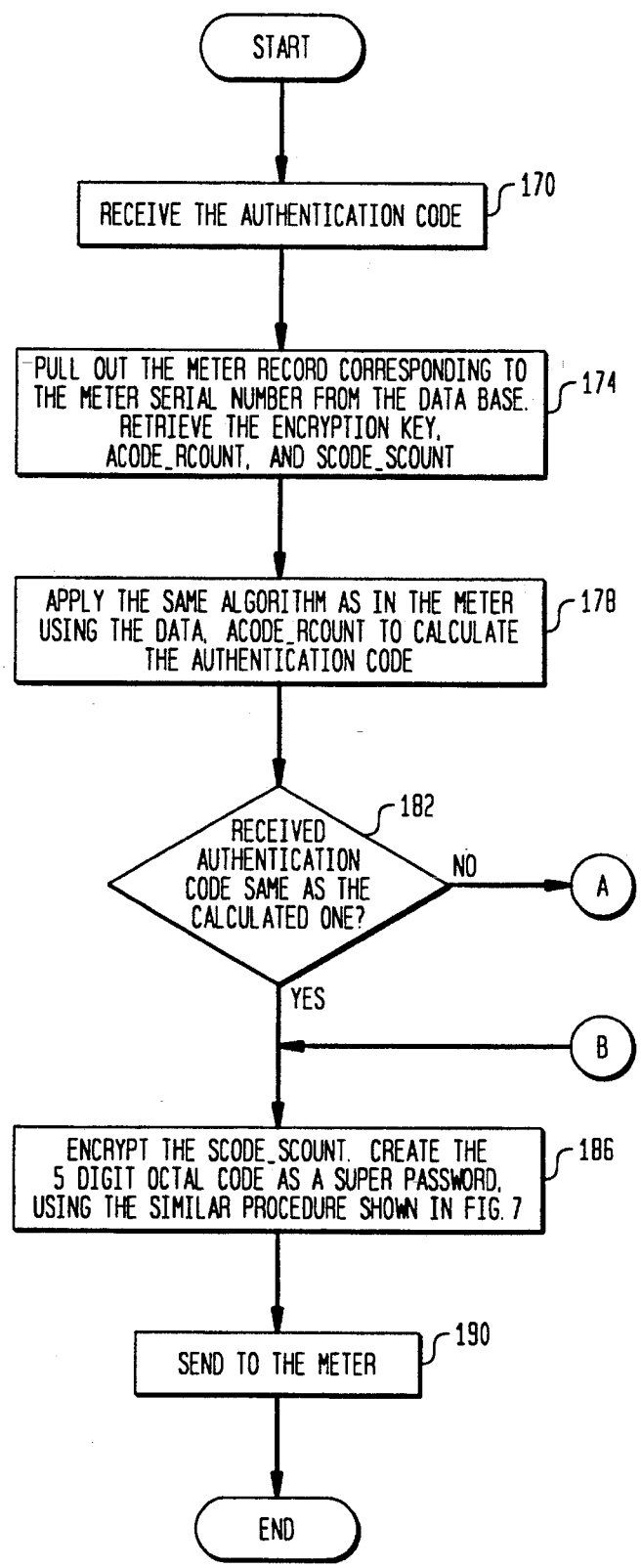
FIG. 9 (9A and 9B) is a flow chart of the Data Center accepting the authentication code and issuing the super password.
Figure 9B:
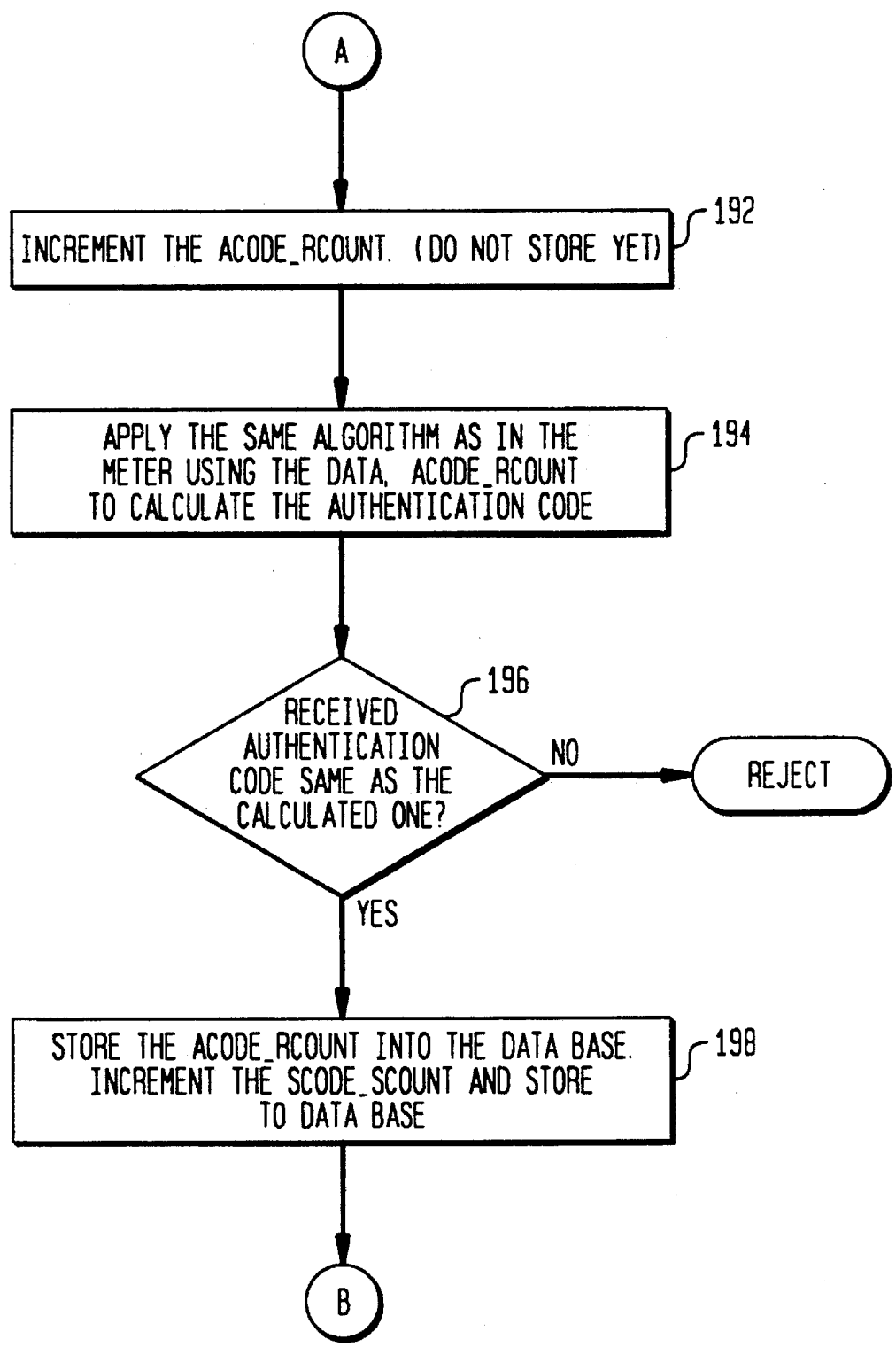

Referring now to FIG. 9 (9A and 9B), a process is shown through which the Data Center accepts the authentication code and issues the super password. At step 170, the Data Center receives the authentication code. At step 174, The Data Center retrieves from its data base the meter record corresponding to the meter serial number of vault 20 and obtains from the record the encryption key, the Authentication Code Receive Count (ACODE_RCOUNT), and the Super Password Send Count (SCODE_SCOUNT). At step 178, the Data Center calculates an authentication code by applying the encryption key to the Authentication Code Receive Count (ACODE_RCOUNT) to obtain encrypted data. A five digit octal number is obtained from the encrypted data, at step 136. The least significant 15 bits of the encrypted data are divided into five digits, each 3 bits long. This five digit number is the calculated authentication code. At step 182, the Data Center compares the received authentication code to the calculated one. If they are the same, then at step 186, the Data Center creates a 5 digit octal code as the super password in the following manner. The encryption key is applied to the Super Password Send Count (SCODE_SCOUNT)) to obtain encrypted data. A five digit octal number is obtained from the encrypted data, the least significant 15 bits of which are divided into five digits, each 3 bits long. This is the new super password that is sent to the meter at step 190.

If, at step 182, the received authentication code was not the same as the calculated one, then at step 192, the Authentication Code Receive Count (ACODE_RCOUNT) is incremented but not stored yet. At step 194, the encryption key is applied to the Authentication Code Receive Count (ACODE_RCOUNT) to obtain a calculated authentication code. At step 196, the received authentication code is compared to the calculated one. If not the same, the received authentication code is rejected. If the same, then at step 198, the Authentication Code Receive Count (ACODE_RCOUNT) is stored into the Data Center database, and the Super Password Send Count (SCODE_SCOUNT) is incremented and stored into the database.

Thus, the present invention provides a convenient method for reinitializing the user password system of a metering system without compromising the security of the metering system or the password protection system. While the present invention has been described for a preferred embodiment relating to a postage metering system. It will be understood by those skilled in the art that the present invention is also suitable for use in transaction evidencing systems in general, such as for monetary transactions, item transactions and information transactions, wherein such systems are protected by a secure user password system.

While the present invention has been disclosed and described with reference to a single embodiment thereof, it will be apparent, as noted above that variations and modifications may be made therein. It is, thus, intended in the following claims to cover each variation and modification that falls within the true spirit and scope of the present invention.

What is claimed is:

1. A method of reinitializing a user password system in a transaction evidencing device, the method comprising the steps of:

sharing secret data in the transaction evidencing device and in a database at a data center for performing secure communications therebetween, the secret data including at least two counters and an encryption key;

requesting for the transaction evidencing device a super password from the data center;

authenticating at the data center the transaction evidencing device requesting the super password;

issuing a super password from the data center for the authenticated transaction evidencing device;

entering the super password into the transaction evidencing device;

authenticating in the transaction evidencing device the super password entered in the transaction evidencing device; and resetting the user password in the transaction evidencing device upon verification of the authenticity of the super password.

2. The method of claim 1, comprising the further steps of:

requesting the super password directly from the transaction evidencing device to the data center; and sending the super password directly from the data center to the transaction evidencing device.

3. The method of claim 2, comprising the further steps of:

storing the secret data in the transaction evidencing device and in a data center record corresponding to the transaction evidencing device; and initializing the counters at manufacture of the transaction evidencing device.

4. A method of reinitializing a user password system in a metering system, the method comprising the steps of:

sharing secret data in a meter and a data center;

generating a one time authentication code in the meter;

sending a serial number and the one time authentication code from the meter to the data center;

verifying at the data center the one time authentication code and a user requesting reinitialization of the user password system;

issuing at the data center for the meter a one-time use, super password;

entering the super password into the meter;

verifying the super password entered matches an internally calculated password;

resetting the user password system in the meter upon the verification of the super password.

5. The method of claim 4 wherein the step of sharing secret data comprises the further steps of:

storing in the meter at the time of manufacture an encryption key, an authentication code send count (ACODE_SCOUNT) and a super password receive count (SCODE_RCOUNT), each of the counts being initialized to a predetermined number; and storing a meter record in a database at the data center, the meter record containing parameters of the meter at the time of manufacture, the parameters including meter serial number, the encryption key, an authentication code receive count (ACODE_RCOUNT); and a super password send count (SCODE_SCOUNT), each of the counts being initialized to the predetermined number).

6. The method of claim 5 wherein the step of generating a one time authentication code in the meter comprises the further steps of:

applying the authentication code send count (ACODE_SCOUNT) to obtain encrypted data; and using predetermined bits of the encrypted data to obtain the one time authentication code.

7. The method of claim 6 wherein the steps of the data center verifying the one time authentication code and issuing the super password comprise the further steps of:

receiving the one time authentication code;

retrieving from the database the meter record corresponding to the serial number of the meter and obtaining from the meter record the encryption key, the authentication code receive count (ACODE_RCOUNT), and the super password send count (SCODE_SCOUNT);

applying the encryption key to the authentication code receive count (ACODE_RCOUNT) to obtain encrypted data;

using predetermined bits of the encrypted data to obtain a calculated authentication code.

comparing the one time authentication code to the calculated authentication code; and issuing the super password if the one time authentication code matches the calculated authentication code.

8. The method of claim 7 wherein the step of issuing the super password comprises the further steps of:

applying the encryption key to the super password send count (SCODE_SCOUNT) to obtain encrypted data; and using predetermined bits of the encrypted data to obtain the super password.

9. The method of claim 8 comprising the further steps of:

incrementing the authentication code receive count (ACODE_RCOUNT) when the calculated authentication code does not match the one time authentication code;

applying the encryption key to the authentication code receive count (ACODE_RCOUNT) to obtain a newly calculated authentication code;

comparing the one time authentication code to the newly calculated authentication code;

rejecting the request for a super password if the one time authentication code does not match the newly calculated authentication code; and issuing the super password if the one time authentication code matches the newly calculated authentication code.

10. The method of claim 5 wherein the step of verifying the super password entered matches an internally calculated password comprises the further steps of:

applying the encryption key to the super password receive count (SCODE_RCOUNT) to obtain encrypted data;

using predetermined bits of the encrypted data to obtain a calculated super password;

comparing the calculated super password to the entered super password;

rejecting the entered super password if the calculated super password does not match the entered super password; and accepting the super password if the calculated super password does match the entered super password, and incrementing in the meter the authentication code send count (ACODE_SCOUNT); and the super password receive count (SCODE_RCOUNT).

* * * * *